(12) United States Patent
Yagi et al.

(10) Patent No.: US 10,114,219 B2
(45) Date of Patent: Oct. 30, 2018

(54) BACKLIGHT UNIT AND HEAD-UP DISPLAY DEVICE

(71) Applicant: Yazaki Corporation, Tokyo (JP)

(72) Inventors: Kenji Yagi, Shizuoka (JP); Hidetoshi Mukojima, Shizuoka (JP); Naohisa Murata, Shizuoka (JP); Naoto Tsubakihara, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/832,865

(22) Filed: Dec. 6, 2017

(65) Prior Publication Data

US 2018/0217376 A1    Aug. 2, 2018

(30) Foreign Application Priority Data

Jan. 27, 2017    (JP) ................. 2017-012798

(51) Int. Cl.
*G02B 27/00*    (2006.01)
*G02B 27/01*    (2006.01)
*G02F 1/1333*    (2006.01)
*G02F 1/1335*    (2006.01)

(52) U.S. Cl.
CPC ..... *G02B 27/0149* (2013.01); *G02B 27/0101* (2013.01); *G02F 1/133308* (2013.01); *G02F 1/133615* (2013.01); *G02B 2027/015* (2013.01)

(58) Field of Classification Search
CPC ............ G02B 27/0419; G02B 27/0101; G02B 2027/015; G02F 1/133308; G02F 1/133615
USPC ....................................... 362/97.2
See application file for complete search history.

(56) References Cited

U.S. PATENT DOCUMENTS

2013/0258708 A1* 10/2013 Huang ................. G02B 6/0023
                                                        362/608
2016/0266299 A1*  9/2016 Yoon ........................ G02B 6/00
2016/0291234 A1* 10/2016 Qiu ....................... G02B 6/0011

FOREIGN PATENT DOCUMENTS

JP          2016-065907 A       4/2016

* cited by examiner

*Primary Examiner* — Daniel Hess
(74) *Attorney, Agent, or Firm* — Sughrue Mion, PLLC (57) ABSTRACT

A backlight unit includes a housing having an opening in which an liquid crystal display device is disposed, a light source disposed inside the housing, and an optical member disposed inside the housing, turning a path of light from the light source toward the liquid crystal display device, and having a triangular prism portion made of a translucent material. The prism portion has one side wall serving as an entrance wall on which the light from the light source is incident, another side wall as an exit wall emitting light to the liquid crystal display device, and still another side wall as a reflecting wall reflecting the light incident on the entrance wall to the exit wall inside the prism portion.

4 Claims, 9 Drawing Sheets

BACKLIGHT UNIT AND HEAD-UP DISPLAY DEVICE

CROSS-REFERENCE TO RELATED APPLICATION(S)

The present application claims priority to and incorporates by reference the entire contents of Japanese Patent Application No. 2017-012798 filed in Japan on Jan. 27, 2017.

BACKGROUND OF THE INVENTION

1. Field of the Invention

The present invention relates to a backlight unit and a head-up display device.

2. Description of the Related Art

Backlight units used for, for example, head-up display devices are known. Japanese Patent Application Laid-open No. 2016-065907 discloses a technology relating to a backlight unit that includes a plurality of focusing lenses that focus light beams emitted from an image of a light source onto a display region of a liquid crystal display element.

More optical members such as lenses or mirrors in a backlight unit may result in a larger device size. It is desirable that backlight units have a smaller device size.

SUMMARY OF THE INVENTION

It is an object of the present invention to provide a backlight unit and a head-up display device that can achieve a smaller device size.

A backlight unit according to one aspect of the present invention includes a housing having an opening in which a liquid crystal display device is disposed; a light source disposed inside the housing; and an optical member disposed inside the housing and configured to turn a light beam path of light beams emitted by the light source toward the liquid crystal display device, wherein the optical member has a prism portion which is made of a translucent material to have a triangular prism shape, the prism portion has one side wall serving as an entrance wall on which the light beams emitted by the light source are incident, another side wall serving as an exit wall from which light beams are emitted to the liquid crystal display device, and still another side wall serving as a reflecting wall that reflects the light beams that have been incident on the entrance wall to the exit wall inside the prism portion, and at least one side wall among the entrance wall, the exit wall, and the reflecting wall has a curved surface shape having an optical property that changes a degree of increase or decrease in a beam width of light beams passing through the one side wall to an increasing or decreasing direction.

According to another aspect of the present invention, in the backlight unit, it is preferable that all of the entrance wall, the exit wall, and the reflecting wall have the curved surface shape having the optical property.

According to still another aspect of the present invention, in the backlight unit, it is preferable that the curved surface shape of the entrance wall, the exit wall, and the reflecting wall is a convex shape curving outward relative to the prism portion.

A head-up display device according to still another aspect of the present invention includes a liquid crystal display device; and a backlight unit, wherein the backlight unit includes a housing having an opening in which the liquid crystal display device is disposed, a light source disposed inside the housing, and an optical member disposed inside the housing and configured to turn a light beam path of light beams emitted by the light source toward the liquid crystal display device, the optical member has a prism portion which is made of a translucent material to have a triangular prism shape, the prism portion has one side wall serving as an entrance wall on which the light beams emitted by the light source are incident, another side wall serving as an exit wall from which light beams are emitted to the liquid crystal display device, and still another side wall serving as a reflecting wall that reflects the light beams that have been incident on the entrance wall to the exit wall inside the prism portion, and at least one side wall among the entrance wall, the exit wall, and the reflecting wall has a curved surface shape having an optical property that changes a degree of increase or decrease in a beam width of light beams passing through the one side wall to an increasing or decreasing direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following fully describes a backlight unit and a head-up display device according to an embodiment of the present invention with reference to the accompanying drawings. The embodiment is presented for illustrative purposes only and not intended to limit the scope of the present invention. The components described in the embodiment below include components that can be easily thought of by those skilled in the art or components that are substantially identical to each other.

EMBODIMENT

Figure 1:
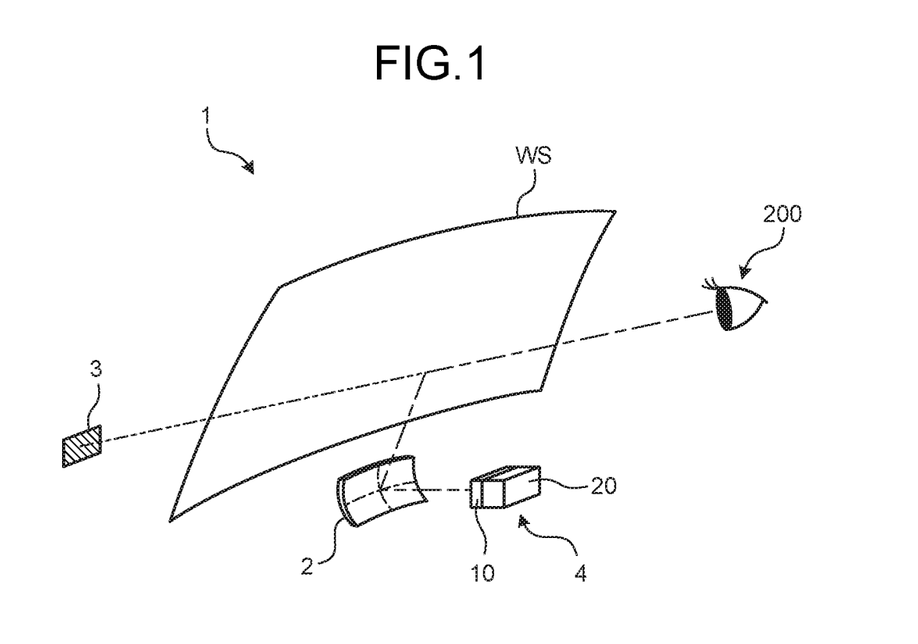
FIG. 1 is a diagram illustrating a general configuration of a head-up display device according to an embodiment of the present invention.
Figure 3:
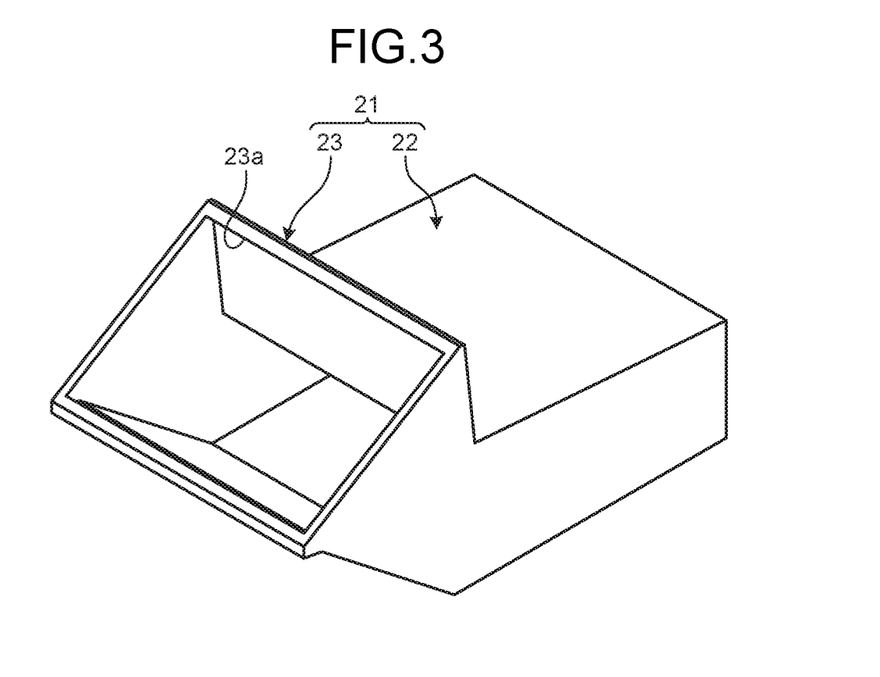
FIG. 3 is a perspective view of a housing according to the embodiment.
Figure 4:
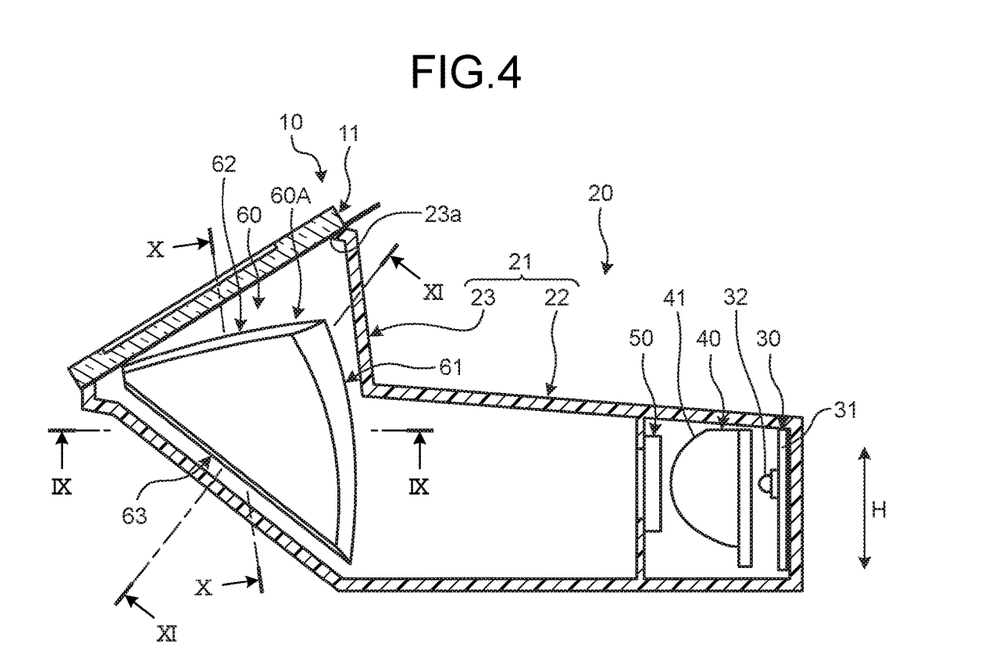
FIG. 4 is a side transparent view of the projector unit according to the embodiment.
Figure 5:
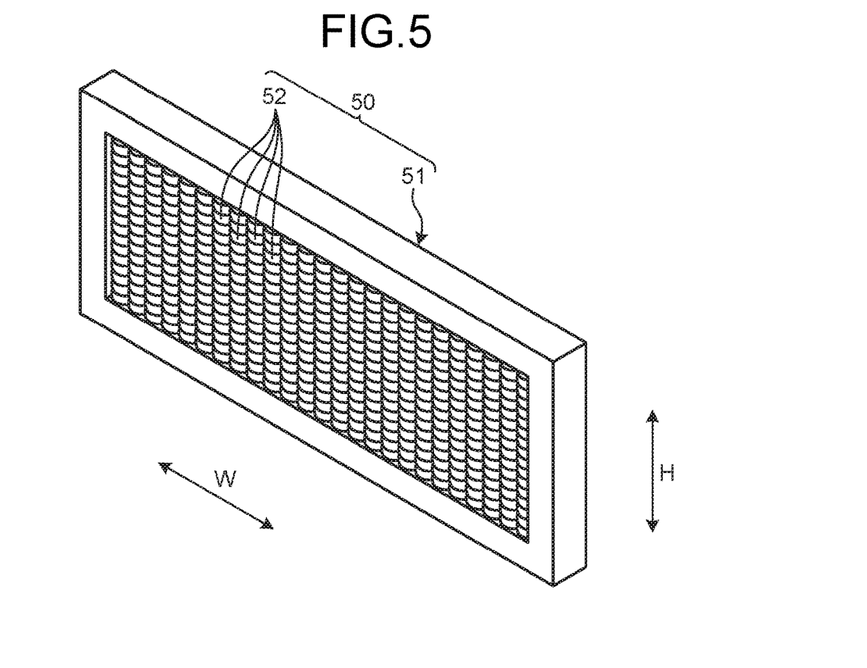
FIG. 5 is a perspective view of a diffusion lens according to the embodiment.
Figure 6:
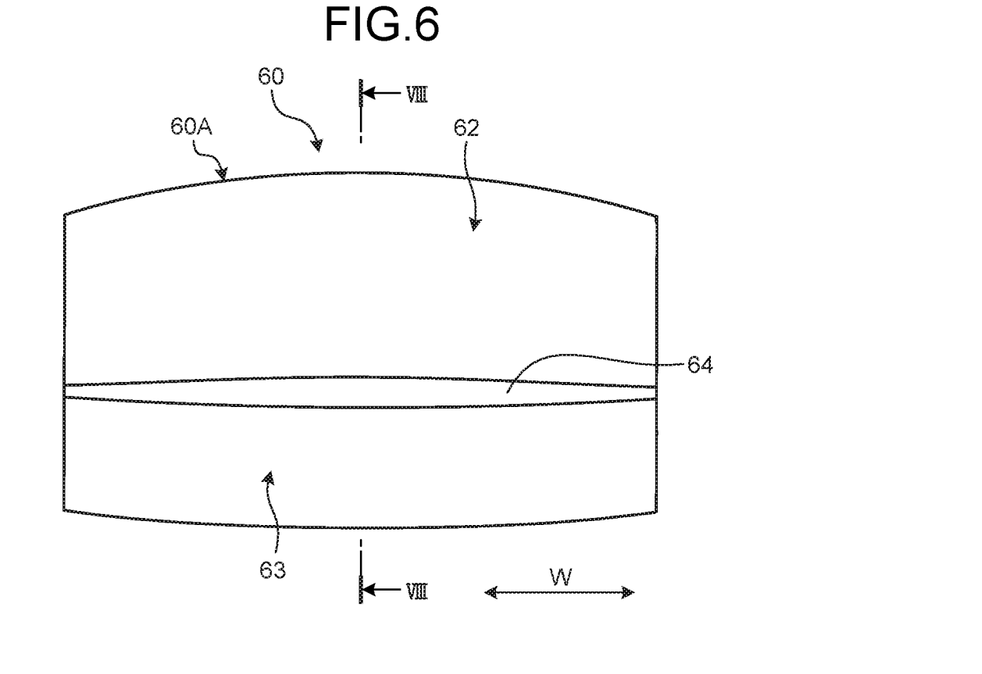
FIG. 6 is a plan view of an optical member according to the embodiment.
Figure 7:
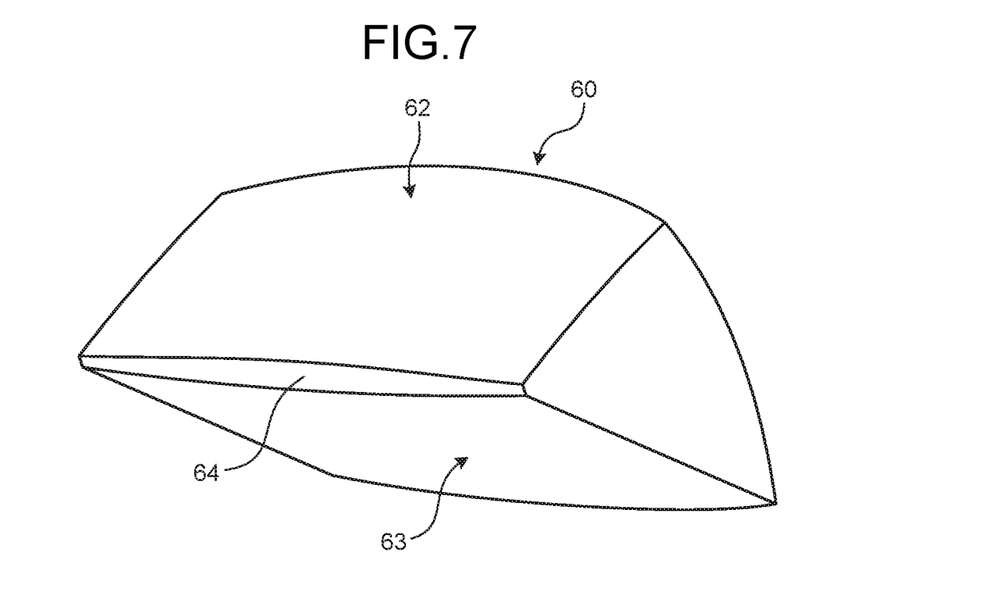
FIG. 7 is a perspective view of the optical member according to the embodiment.

An embodiment will be described with reference to FIGS. 1 to 14. The present embodiment relates to a backlight unit and a head-up display device. FIG. 1 is a diagram illustrating a general configuration of the head-up display device according to the embodiment, FIG. 2 is a perspective view of a projector unit according to the embodiment, FIG. 3 is a perspective view of a housing according to the embodiment, FIG. 4 is a side transparent view of the projector unit according to the embodiment, FIG. 5 is a perspective view of a diffusion lens according to the embodiment, FIG. 6 is a plan view of an optical member according to the embodiment, and FIG. 7 is a perspective view of the optical member according to the embodiment.

As illustrated in FIG. 1, this head-up display device 1 according to the embodiment includes a mirror 2, a liquid crystal display device 10, a backlight unit 20, and a windshield WS. The windshield WS is an example of a reflective member disposed at a front side of a vehicle relative to a driver 200. The windshield WS is a transflective member that transmits some light beams and reflects the other light beams. The windshield WS may be coated with a transflective coating.

The liquid crystal display device 10 and the backlight unit 20 constitute a projector unit 4 that projects an image. The backlight unit 20 emits light beams to the back face of the liquid crystal display device 10, and an image displayed on the liquid crystal display device 10 is projected by the light beams. The mirror 2 reflects the image projected by the projector unit 4 to the windshield WS. The mirror 2 is, for example, an aspheric mirror. The image projected by the projector unit 4 is reflected on the mirror 2 and the windshield WS, thereby forming a virtual image 3. The virtual image 3 seen by the driver 200 is formed at a front side of the vehicle relative to the windshield WS.

Figure 2:
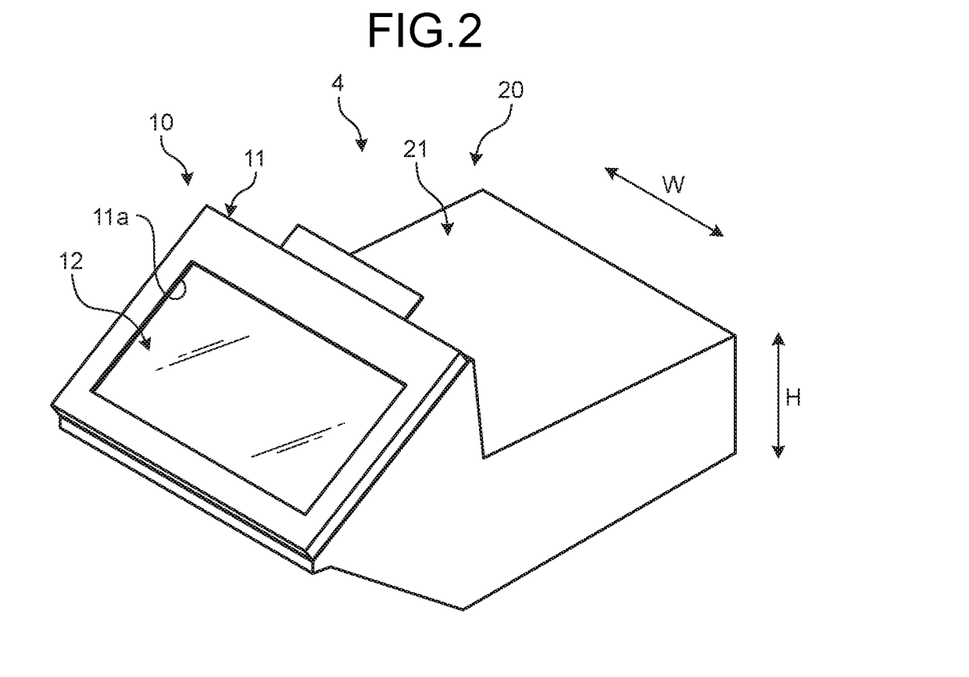
FIG. 2 is a perspective view of a projector unit according to the embodiment.

As illustrated in FIG. 2, the liquid crystal display device 10 includes a holding member 11 and a liquid crystal display unit 12. The holding member 11 holds the liquid crystal display unit 12 and is fixed to a housing 21 to be described later. The holding member 11 is a rectangular plate-like member having an opening 11a. The opening 11a in the present embodiment is a rectangular opening. The longitudinal direction of the opening 11a corresponds to the longitudinal direction of an image to be projected onto the windshield WS. The longitudinal direction of the image to be projected onto the windshield WS typically corresponds to the lateral direction of the vehicle. The liquid crystal display unit 12 is fixed to the holding member 11 such that it closes the opening 11a. The liquid crystal display unit 12 is, for example, a thin-film transistor liquid crystal display (TFT-LCD). The liquid crystal display unit 12 creates an image to be displayed as the virtual image 3.

The backlight unit 20 includes the housing 21. The housing 21 and the holding member 11 are made of a material such as metal or a resin that does not transmit light beams. As illustrated in FIG. 3, the housing 21 includes a main body 22 and a sloping portion 23. The main body 22 and the sloping portion 23 are tubular components and are integrated. The main body 22 is a rectangular tubular component and an end thereof away from the sloping portion 23 is closed. The sloping portion 23 slopes relative to the main body 22. In other words, the housing 21 is a tubular member having a bent portion at the joint between the main body 22 and the sloping portion 23. The sloping portion 23 has an opening 23a at an end away from the main body 22. The opening 23a in the present embodiment is a rectangular opening. The opening 23a is larger than the opening 11a of the liquid crystal display device 10. The liquid crystal display device 10 is fixed to the housing 21 and closes the opening 23a.

As illustrated in FIG. 4, the backlight unit 20 further includes a light-emitting diode (LED) substrate 30, a lens array 40, a diffusion lens 50, and an optical member 60. The LED substrate 30 is disposed at the innermost portion of the housing 21. In the housing 21, the lens array 40, the diffusion lens 50, and the optical member 60 are arranged in this order from the LED substrate 30 toward the opening 23a. The LED substrate 30 includes a substrate body 31 and a plurality of LEDs 32. The LEDs 32 are light-emitting diodes and are fixed to the substrate body 31. The LEDs 32 serve as the light source of the backlight unit 20. The LEDs 32 are linearly aligned with a certain gap therebetween on the substrate body 31 according to the present embodiment. The LEDs 32 are aligned in a width direction W (see FIG. 2) of the housing 21. The width direction W of the housing 21 corresponds to the direction into the page in FIG. 4. The substrate body 31 includes a control circuit for controlling the LEDs 32. The control circuit controls on/off of the LEDs 32 and the brightness of the LEDs 32.

The lens array 40 is disposed close to the LEDs 32 facing them. The lens array 40 is an aggregate of condenser lenses that gather light beams emitted by the LEDs 32. The lens array 40 includes a plurality of lenses 41. The lenses 41 are arranged in the width direction W of the housing 21 with a certain gap therebetween. The individual lenses 41 are coaxially disposed with respect to the corresponding LEDs 32. The lenses 41 render light beams emitted by the LEDs 32 into parallel light beams and emit them to the diffusion lens 50.

The diffusion lens 50 diffuses the light beams coming from the lens array 40 and emits the diffused light beams to the optical member 60. As illustrated in FIG. 5, the diffusion lens 50 is a micro-lens array including a plurality of micro lenses 52. The diffusion lens 50 includes a frame 51 and many micro lenses 52. The frame 51 is a frame-like member having a rectangular outline. The micro lenses 52 are arranged in an array of rows and columns in the width direction W and a height direction H (see FIG. 2) of the housing 21. The micro lenses 52 are held by the frame 51. The micro lenses 52 diffuse light beams coming from the lens array 40 and emit the diffused light beams to the optical member 60. The diffusion lens 50 has a function of producing a uniform light distribution with respect to brightness and a function of scattering light beams in multiple directions.

Referring back to FIG. 4, the optical member 60 is disposed in the sloping portion 23. The optical member 60 has a prism portion 60A having a triangular prism shape. The prism portion 60A has side walls that mainly constitute the triangular prism shape, which are an entrance wall 61, an exit wall 62, and a reflecting wall 63. As illustrated in FIGS. 6 and 7, the optical member 60 according to the present embodiment has a joint surface 64 that joins the exit wall 62 and the reflecting wall 63.

The optical member 60 is disposed in an inner space of the sloping portion 23 such that the axial direction of the prism portion 60A matches the width direction W of the housing 21. In other words, the optical member 60 is disposed such that the entrance wall 61, the exit wall 62, and the reflecting wall 63 extend in the width direction W of the housing 21. The optical member 60 is disposed such that the entrance wall 61 faces the diffusion lens 50. Light beams emitted by the LEDs 32, which serve as the light source, are incident on the optical member 60 from the entrance wall 61 out of the entrance wall 61, the exit wall 62, and the reflecting wall 63. Both ends of the optical member 60 are held by inner walls of the housing 21.

The optical member 60 is made of a translucent material. The optical member 60 according to the present embodiment is made of a colorless, transparent material. Examples of the material for the optical member 60 include synthetic resins such as a polycarbonate resin and an acrylic resin. The entrance wall 61, the exit wall 62, and the reflecting wall 63 of the optical member 60 according to the present embodiment each have a curved outer surface.

Figure 8:
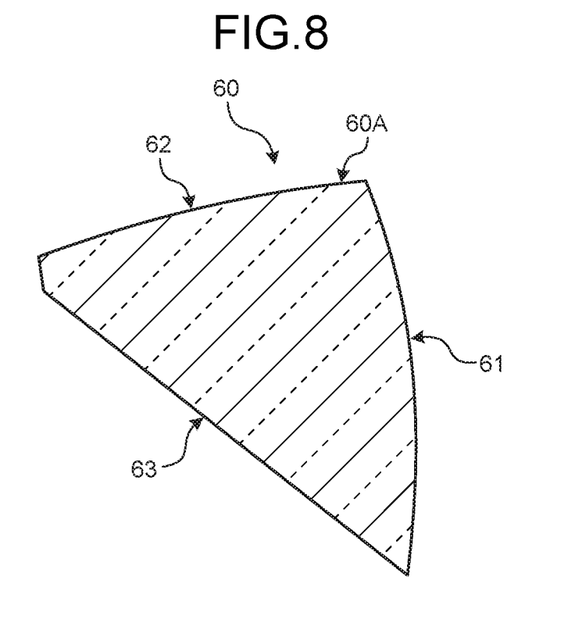
FIG. 8 is a cross sectional view of the optical member according to the embodiment.

FIG. 8 illustrates a section cut along line VIII-VIII in FIG. 6. The section illustrated in FIG. 8, that is, a section orthogonal to the axial direction of the prism portion 60A, is referred to as a "cross section". As illustrated in FIG. 8, the section shape of the entrance wall 61, the exit wall 62, and the reflecting wall 63 in the cross section is a curved shape. More specifically, the entrance wall 61, the exit wall 62, and the reflecting wall 63 each have a convex shape curving outward relative to the prism portion 60A. The section illustrated in FIG. 8 is a section cut at the center of the prism portion 60A in the axial direction. Cross sections at other positions of the prism portion 60A in the axial direction exhibit the same convex shape with respect to the entrance wall 61, the exit wall 62, and the reflecting wall 63. In other words, the outer surface of the entrance wall 61, the exit wall 62, and the reflecting wall 63 is a generally convex surface curving outward relative to the prism portion 60A. As illustrated in FIG. 8, the curvature of the reflecting wall 63 in the cross section shape is relatively moderate compared to the curvature of the entrance wall 61 and the exit wall 62 in the cross section shape. The reflecting wall 63 has a curved section shape that is nearly a straight line.

Figure 9:
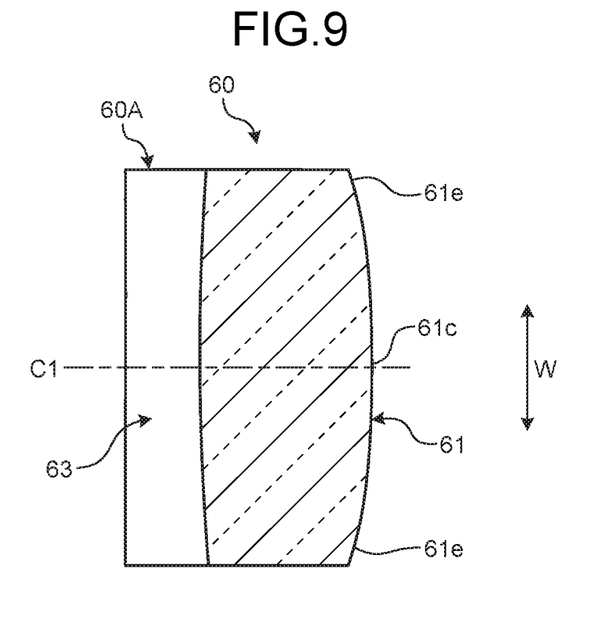
FIG. 9 is a longitudinal sectional view of the optical member according to the embodiment.

FIG. 9 illustrates a section cut along line IX-IX in FIG. 4. The section cut along the axial direction of the prism portion 60A as illustrated in FIG. 9 is referred to as a "longitudinal section". As illustrated in FIG. 9, the section shape of the entrance wall 61 in the longitudinal section is a convex shape curving outward relative to the prism portion 60A. The section shape of the entrance wall 61 is symmetric with respect to a center line C1. The center line C1 is a line drawn at the center of the prism portion 60A in the axial direction. In the section shape of the entrance wall 61, the center portion in the axial direction is most protruding. In the section shape of the entrance wall 61, the curvature of end portions 61e in the axial direction is higher than the curvature of this center portion 61c.

Figure 10:
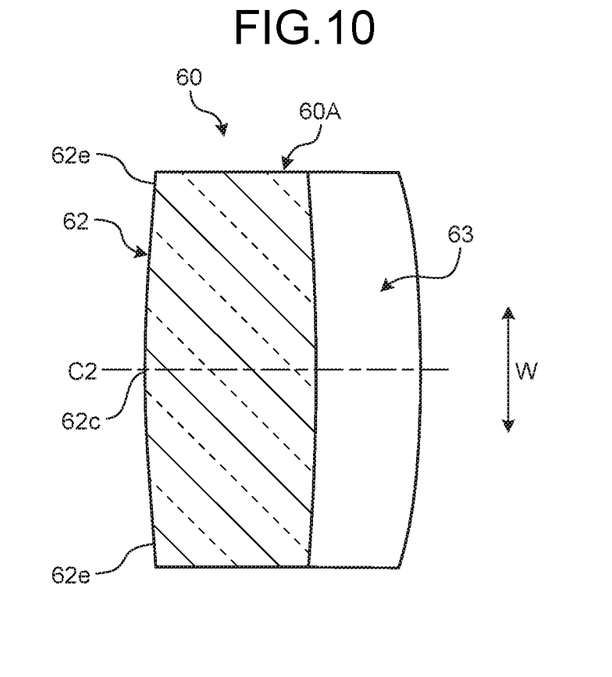
FIG. 10 is another longitudinal sectional view of the optical member according to the embodiment.

FIG. 10 illustrates a section cut along line X-X in FIG. 4. As illustrated in FIG. 10, the section shape of the exit wall 62 in the longitudinal section is a convex shape curving outward relative to the prism portion 60A. The section shape of the exit wall 62 is symmetric with respect to a center line C2. The center line C2 is a line drawn at the center of the prism portion 60A in the axial direction. In the section shape of the exit wall 62, the center portion in the axial direction is most protruding. In the section shape of the exit wall 62, the curvature of end portions 62e in the axial direction is higher than the curvature of this center portion 62c.

Figure 11:
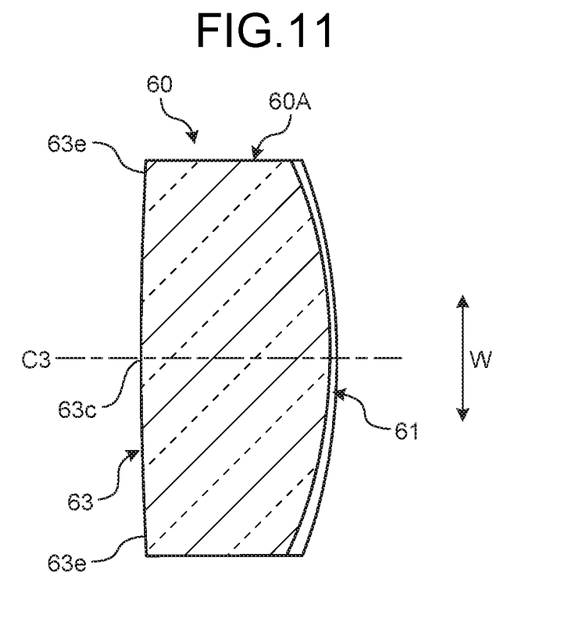
FIG. 11 is still another longitudinal sectional view of the optical member according to the embodiment.

FIG. 11 illustrates a section cut along line XI-XI in FIG. 4. As illustrated in FIG. 11, the section shape of the reflecting wall 63 in the longitudinal section is a convex shape curving outward relative to the prism portion 60A. The section shape of the reflecting wall 63 is symmetric with respect to a center line C3. The center line C3 is a line drawn at the center of the prism portion 60A in the axial direction. In the section shape of the reflecting wall 63, the center portion in the axial direction is most protruding. In the section shape of the reflecting wall 63, the curvature of end portions 63e in the axial direction is higher than the curvature of this center portion 63c. In the optical member 60 according to the present embodiment, the curvature of the reflecting wall 63 in the section shape is lower than that of the entrance wall 61 and the exit wall 62 when compared to each other at the same position in the axial direction.

Figure 12:
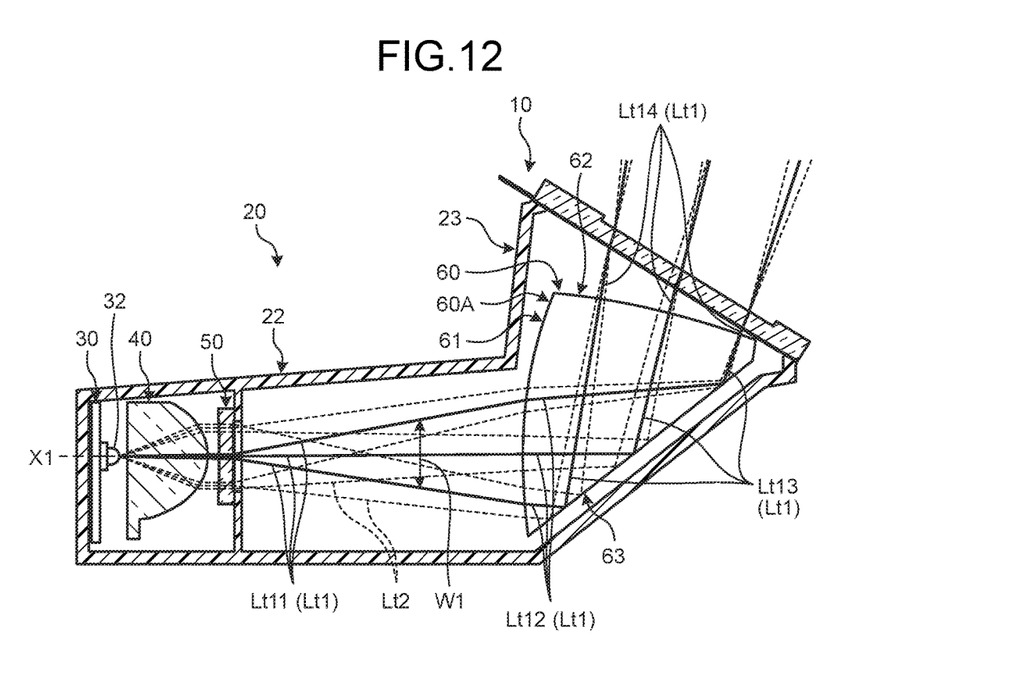
FIG. 12 is a sectional view illustrating an example of a light beam path in the backlight unit according to the embodiment.

FIG. 12 illustrates a section of the backlight unit 20 and an example of a light beam path. The section illustrated in FIG. 12 is orthogonal to the axial direction of the optical member 60 and cut at the center of the optical member 60 in the axial direction. With reference to FIG. 12, a function of adjusting a beam width W1 by the optical member 60 seen in a section orthogonal to the axial direction of the optical member 60 will be described.

In FIG. 12, light beams Lt1 traveling on the section are indicated by solid lines. Light beams Lt2, which are other light beams than the light beams Lt1, traveling on the section are indicated by dashed lines. As illustrated in FIG. 12, the light beams Lt1 and Lt2 emitted by the LEDs 32 and diffused by the diffusing lens 50 are incident on the prism portion 60A from the entrance wall 61. The light beams traveling into the prism portion 60A from the entrance wall 61 are reflected on the reflecting wall 63 to the exit wall 62. In other words, the reflecting wall 63 functions as a reflective surface that reflects the light beams that have been incident on the entrance wall 61 to the exit wall 62 inside the prism portion 60A. The light beams reflected on the reflecting wall 63 are emitted from the exit wall 62 toward the outer space.

The entrance wall 61 changes the degree of increase or decrease in the beam width W1 to a decreasing direction. The beam width W1 is a width of a light beam path on the section orthogonal to the axial direction of the optical member 60. The degree of increase or decrease in the beam width W1 is typically a rate of increase or decrease in the beam path W1 along an optical axis X1. The rate of increase or decrease is, for example, a rate of increase or a rate of decrease in the beam path W1 per unit length of the optical axis X1. In the present description, diverging of light beams as the beams travel along is referred to as increase in the beam width W1, whereas converging of light beams as the beams travel along is referred to as decrease in the beam width W1.

Changing the degree of increase or decrease in the beam width W1 to an increasing direction by the walls 61, 62, and 63 includes at least (1) to (3) below.
(1) Enhancing a degree of increase in the beam width W1 of incoming light beams traveling with an increasing beam width W1. In other words, light beams are further diverged.
(2) Changing incoming light beams traveling with a decreasing or a constant beam width W1 into light beams traveling with an increasing beam width W1. In other words, converging light beams or parallel light beams are changed to diverging light beams.

(3) Reducing a degree of decrease in the beam width W1 of incoming light beams traveling with a decreasing beam width W1. In other words, the degree of convergence of the light beams is reduced.

Changing the degree of increase or decrease in the beam width W1 to a decreasing direction by the walls 61, 62, and 63 includes at least (4) to (6) below.

(4) Enhancing a degree of decrease in the beam width W1 of incoming light beams traveling with a decreasing beam width W1. In other words, light beams are further converged.

(5) Changing incoming light beams traveling with an increasing or a constant beam width W1 into light beams traveling with a decreasing beam width W1. In other words, diverging light beams or parallel light beams are changed to converging light beams.

(6) Reducing a degree of increase in the beam width W1 of incoming light beams traveling with an increasing beam width W1. In other words, the degree of divergence of the light beams is reduced.

The entrance wall 61 according to the present embodiment performs the operation of (6) above. In other words, the entrance wall 61 refracts light beams to reduce the degree of divergence of the light beams. In the following description, the light beams Lt1 that travel on the section are referred to as: incoming light beams Lt11 traveling to the entrance wall 61; refracted light beams Lt12 traveling from the entrance wall 61 to the reflecting wall 63 inside the prism portion 60A; reflected light beams Lt13 reflected on the reflecting wall 63 and traveling to the exit wall 62 inside the prism portion 60A; and outgoing light beams Lt14 emitted from the exit wall 62. The entrance wall 61 changes the degree of increase in the beam width W1 of the incoming light beams Lt11 such that the degree of increase in the beam width W1 of the refracted light beams Lt12 becomes smaller than that of the incoming light beams Lt11. Shapes or normal directions at portions of the entrance wall 61 are determined such that the degree of divergence of the refracted light beams Lt12 becomes smaller than that of the incoming light beams Lt11. Shapes or normal directions at portions of the entrance wall 61 are determined, for example, based on the angles at which the incoming light beams Lt11 from the diffusion lens 50 are incident on the entrance wall 61, the refractive index of the material of the optical member 60, and target angles of refraction of the refracted light beams Lt12.

The reflecting wall 63 according to the present embodiment performs the operation of (6) above. In other words, the reflecting wall 63 reflects light beams to reduce the degree of divergence of the light beams. The reflecting wall 63 changes the degree of increase in the beam width W1 of the refracted light beams Lt12 such that the degree of increase in the beam width W1 of the reflected light beams Lt13 becomes smaller than that of the refracted light beams Lt12. Shapes or normal directions at portions of the reflecting wall 63 are determined such that the degree of divergence of the reflected light beams Lt13 becomes smaller than that of the refracted light beams Lt12. Furthermore, the reflecting wall 63 according to the present embodiment is configured to totally reflect the refracted light beams Lt12. Shapes or normal directions at portions of the reflecting wall 63 are determined such that the reflecting wall 63 totally reflects the refracted light beams Lt12. Shapes or normal directions at portions of the reflecting wall 63 are determined, for example, based on the angles at which the refracted light beams Lt12 are incident on the reflecting wall 63, the refractive index of the material of the optical member 60, and target angles of reflection of the reflected light beams Lt13.

The exit wall 62 according to the present embodiment performs the operation of (6) above. In other words, the exit wall 62 refracts light beams to reduce the degree of divergence of the light beams. Shapes or normal directions at portions of the exit wall 62 are determined such that the degree of increase in the beam width W1 of the outgoing light beams Lt14 becomes smaller than that of the reflected light beams Lt13. Shapes or normal directions at portions of the exit wall 62 are determined, for example, based on the angles at which the reflected light beams Lt13 are incident on the exit wall 62, the refractive index of the material of the optical member 60, and target angles of refraction of the outgoing light beams Lt14.

The outgoing light beams Lt14 emitted from the exit wall 62 are incident on the back face of the liquid crystal display device 10. An image displayed on the liquid crystal display device 10 is projected by the outgoing light beams Lt14. The image projected from the liquid crystal display device 10 is reflected on the mirror 2 to the windshield WS. The outgoing light beams Lt14 are diverging light beams that travel with an increasing beam width W1. Thus, the image projected from the liquid crystal display device 10 expands toward the windshield WS.

The function of adjusting the beam width W1 by the prism portion 60A is the same at other sectional locations in the axial direction. The beam width W1 may be adjusted by different degrees between the center portion and end portions of the prism portion 60A in the axial direction.

Figure 13:
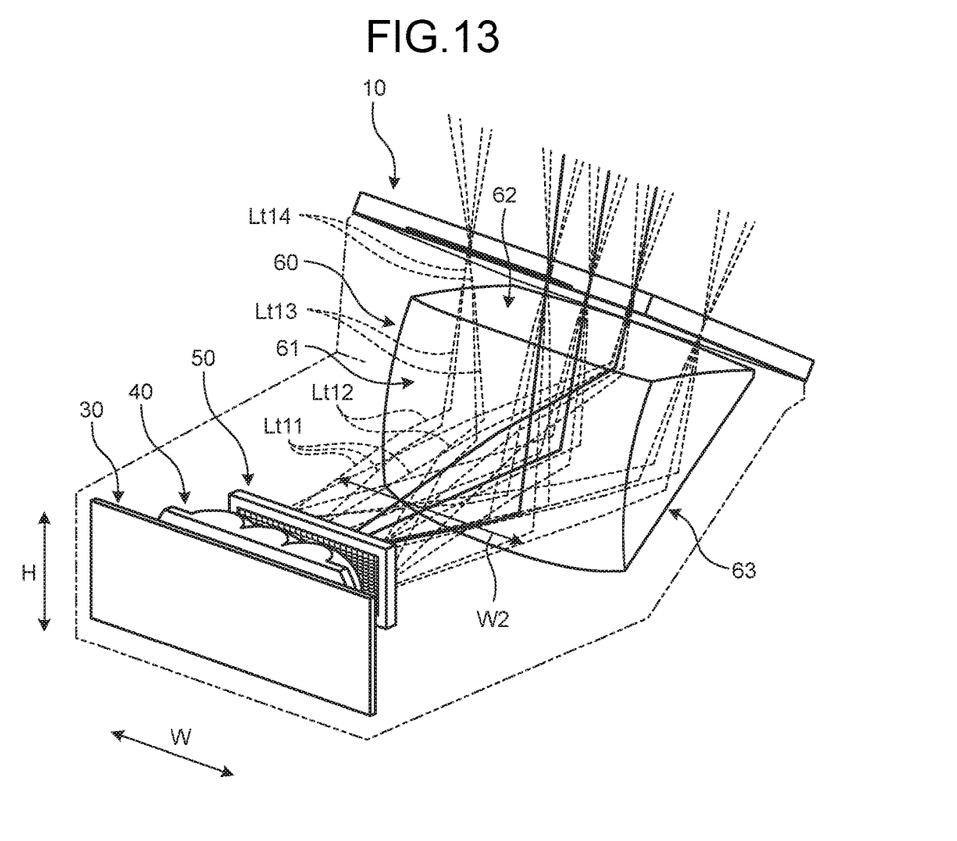
FIG. 13 is a perspective view illustrating an example of a light beam path in the backlight unit according to the embodiment.
Figure 14:
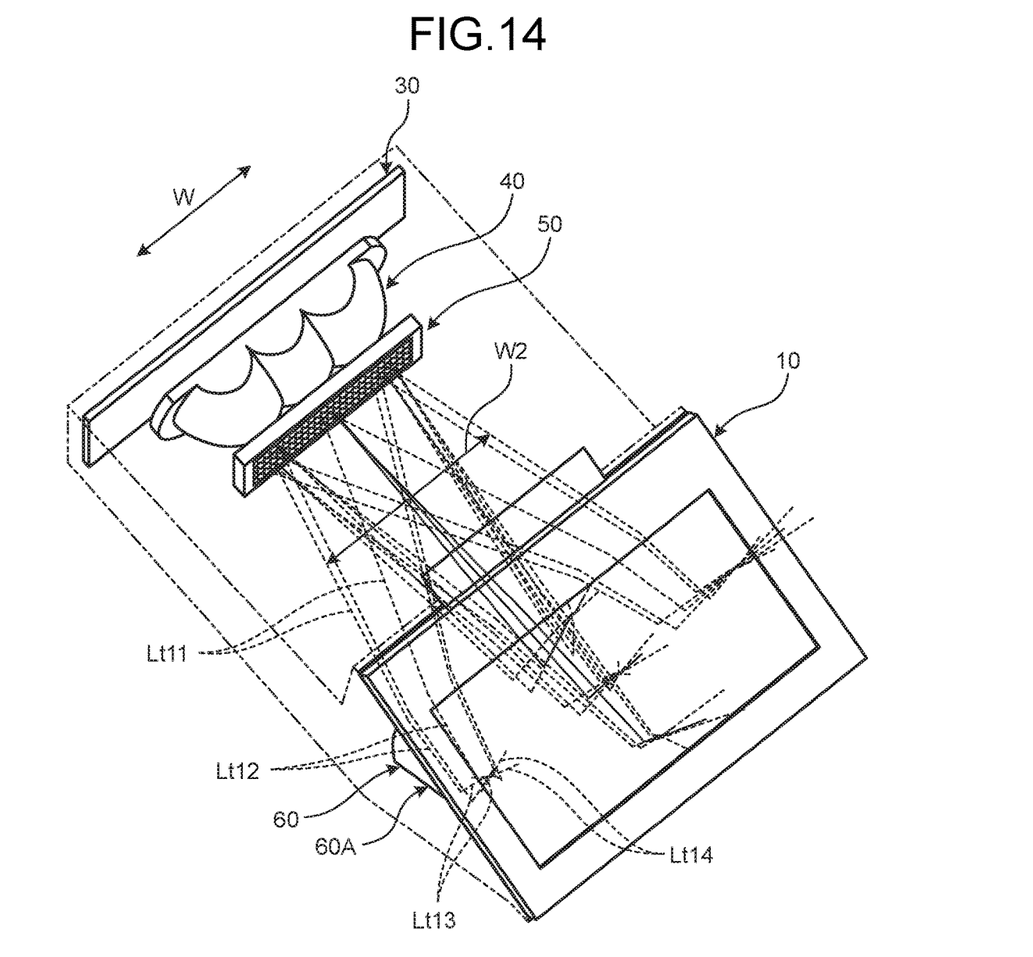
FIG. 14 is another perspective view illustrating an example of the light beam path in the backlight unit according to the embodiment.

Described next is a function of adjusting a beam width W2 that extends in the axial direction of the optical member 60. As illustrated in FIGS. 13 and 14, the incoming light beams Lt11 coming to the entrance wall 61 travel from the diffusion lens 50 to the entrance wall 61 with an increasing beam width W2 that extends in the axial direction. The entrance wall 61 according to the present embodiment performs the operation of (6) above. In other words, the entrance wall 61 refracts light beams to reduce the degree of divergence of the light beams. The entrance wall 61 changes the degree of increase in the beam width W2 of the incoming light beams Lt11 such that the degree of increase in the beam width W2 of the refracted light beams Lt12 becomes smaller than that of the incoming light beams Lt11. Shapes or normal directions at portions of the entrance wall 61 are determined such that the degree of divergence of the refracted light beams Lt12 becomes smaller than that of the incoming light beams Lt11. Shapes or normal directions at portions of the entrance wall 61 are determined, for example, based on the angles at which the incoming light beams Lt11 from the diffusion lens 50 are incident on the entrance wall 61, the refractive index of the material of the optical member 60, and target angles of refraction of the refracted light beams Lt12.

The reflecting wall 63 according to the present embodiment performs the operation of (6) above. In other words, the reflecting wall 63 reflects light beams to reduce the degree of divergence of the light beams. The reflecting wall 63 changes the degree of increase in the beam width W2 of the refracted light beams Lt12 such that the degree of increase in the beam width W2 of the reflected light beams Lt13 becomes smaller than that of the refracted light beams Lt12. Shapes or normal directions at portions of the reflecting wall 63 are determined such that the degree of divergence of the reflected light beams Lt13 becomes smaller than that of the refracted light beams Lt12. As described above, the reflecting wall 63 according to the present embodiment is configured to totally reflect the refracted light beams Lt12. Shapes or normal directions at portions of the reflecting wall 63 are determined, for example, based on the angles at which the refracted light beams Lt12 are incident on the reflecting wall 63, the refractive index of the material of the optical member 60, and target angles of reflection of the reflected light beams Lt13.

The exit wall 62 according to the present embodiment performs the operation of (6) above. In other words, the exit wall 62 refracts light beams to reduce the degree of divergence of the light beams. Shapes or normal directions at portions of the exit wall 62 are determined such that the degree of increase in the beam width W2 of the outgoing light beams Lt14 becomes smaller than that of the reflected light beams Lt13. Shapes or normal directions at portions of the exit wall 62 are determined, for example, based on the angles at which the reflected light beams Lt13 are incident on the exit wall 62, the refractive index of the material of the optical member 60, and target angles of refraction of the outgoing light beams Lt14.

As described above, the backlight unit 20 according to the present embodiment includes the housing 21, the LEDs 32 serving as the light source, and the optical member 60. The housing 21 has the opening 23a in which the liquid crystal display device 10 is disposed. The LEDs 32 are disposed inside the housing 21. The optical member 60 is disposed inside the housing 21 and configured to turn the light beam path of light beams emitted by the LEDs 32 toward the liquid crystal display device 10. The optical member 60 has the prism portion 60A which is made of a translucent material to have a triangular prism shape.

The prism portion 60A has one side walls serving as the entrance wall 61, another side wall serving as the exit wall 62, and still another side wall serving as the reflecting wall 63. The entrance wall 61 is a side wall on which the light beams emitted by the LEDs 32 are incident. The exit wall 62 is a side wall from which light beams are emitted to the liquid crystal display device 10. The reflecting wall 63 is a side wall that reflects the light beams that have been incident on the entrance wall 61 to the exit wall 62 inside the prism portion 60A. At least one side wall among the entrance wall 61, the exit wall 62, and the reflecting wall 63 has a curved surface shape having an optical property that changes the degree of increase or decrease in the beam width of light beams passing through the one side wall to an increasing or decreasing direction.

The optical member 60 according to the present embodiment has the reflecting wall 63 that reflects the light beams from the LEDs 32. The optical member 60 further has the entrance wall 61 and the exit wall 62, at least one of which can change, by refraction, the degree of increase or decrease in the beam widths W1 and W2 to an increasing or decreasing direction. In other words, the optical member 60 has two optical surfaces that can change the degree of increase or decrease in the beam widths W1 and W2 to an increasing or decreasing direction, and has a reflective surface that reflects light beams in the optical member 60. This configuration enables the optical member 60 to implement functions of a plurality of devices such as lenses and mirrors in a single member. Thus, the backlight unit 20 according to the present embodiment can have a smaller device size.

At least one side wall among the entrance wall 61, the exit wall 62, and the reflecting wall 63 has a curved surface shape having an optical property that changes the degree of increase or decrease in the beam width of light beams passing through the at least one side wall to an increasing or decreasing direction. Passing of light beams through a side wall includes passing of light beams through the side wall from the outside to the inside of the prism portion 60A, passing of light beams through the side wall from the inside to the outside of the prism portion 60A, and reflection of light beams on the side surface inside the prism portion 60A.

Side walls having a curved surface shape are advantageous in terms of achieving desired optical properties. When, for example, the reflecting wall 63 has a curved surface shape, the shape is determined such that the reflecting wall 63 changes the degree of increase or decrease in the beam widths W1 and W2 of the reflected light beams Lt13 reflected on the reflecting wall 63 to a certain desired degree. When the entrance wall 61 and the exit wall 62 have a curved surface shape, the shape is determined such that the walls 61 and 62 change the degree of increase or decrease in the beam widths W1 and W2 of the refracted light beams Lt12 and the outgoing light beams Lt14 refracted by the walls 61 and 62 to a certain desired degree. It is desirable that the curved surface shape of the walls 61, 62, and 63 is determined such that the walls produce a uniform light distribution with respect to brightness in the light beam path.

The entrance wall 61, the exit wall 62, and the reflecting wall 63 of the optical member 60 according to the present embodiment all have a curved surface shape having an optical property that changes the degree of increase or decrease in a beam width. In other words, all of the three walls 61, 62, and 63 of the optical member 60 according to the present embodiment can change the degree of increase or decrease in the beam widths W1 and W2. This configuration is advantageous for the optical member 60 according to the present embodiment in terms of achieving desired optical properties.

The curved surface shape of the entrance wall 61, the exit wall 62, and the reflecting wall 63 of the optical member 60 according to the present embodiment is a convex shape curving outward relative to the prism portion 60A. The optical member 60 according to the present embodiment can properly guide light beams emitted by the LEDs 32 to the liquid crystal display device 10 by adjusting the beam widths W1 and W2 in stages.

The head-up display device 1 according to the present embodiment includes the liquid crystal display device 10 and the backlight unit 20 above. The head-up display device 1 according to the present embodiment can have a smaller device size.

Modification of Embodiment

The curved surface shape of the entrance wall 61, the exit wall 62, and the reflecting wall 63 is curving both in the cross section and in the longitudinal section in the above embodiment, but is not limited to this. The section shape of the cross section or the longitudinal section may be a linear shape. For example, the section shape of the reflecting wall 63 in the cross section may be a linear shape. The curved surface shape of the entrance wall 61, the exit wall 62, and the reflecting wall 63 is not limited to a convex shape curving outward relative to the prism portion 60A, and conversely, the curved surface shape may be a convex shape curving inward relative to the prism portion 60A.

In the embodiment above, the entrance wall 61, the exit wall 62, and the reflecting wall 63 all have a curved surface shape, but are not limited to this. At least one wall among the entrance wall 61, the exit wall 62, and the reflecting wall 63 may have a flat shape.

In the embodiment above, the reflecting wall 63 totally reflects the refracted light beams Lt12, but is not limited to this. The reflection of the refracted light beams Lt12 on the reflecting wall 63 may not be total reflection.

The contents disclosed in the embodiment and modification above may be combined as appropriate and implemented.

The backlight unit and the head-up display device according to the present embodiment include a housing having an opening in which a liquid crystal display device is disposed, a light source disposed inside the housing, and an optical member disposed inside the housing and configured to turn a light beam path of light beams emitted by the light source toward the liquid crystal display device. The optical member has a prism portion which is made of a translucent material to have a triangular prism shape. The prism portion has one side wall serving as an entrance wall on which the light beams emitted by the light source are incident, another side wall serving as an exit wall from which light beams are emitted to the liquid crystal display device, and still another side wall serving as a reflecting wall that reflects light beams that have been incident on the entrance wall to the exit wall inside the prism portion.

At least one side wall among the entrance wall, the exit wall, and the reflecting wall has a curved surface shape having an optical property that changes the degree of increase or decrease in the beam width of light beams passing through the one side wall to an increasing or decreasing direction. The backlight unit and the head-up display device according to the present embodiment can be configured by a smaller number of components, thereby achieving a smaller device size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A backlight unit comprising:
a housing having an opening in which a liquid crystal display device is disposed;
a light source disposed inside the housing; and
an optical member disposed inside the housing and configured to turn a light beam path of light beams emitted by the light source toward the liquid crystal display device, wherein
the optical member has a prism portion which is made of a translucent material to have a triangular prism shape,
the prism portion has one side wall serving as an entrance wall on which the light beams emitted by the light source are incident, another side wall serving as an exit wall from which light beams are emitted to the liquid crystal display device, and still another side wall serving as a reflecting wall that reflects the light beams that have been incident on the entrance wall to the exit wall inside the prism portion, and
at least one side wall among the entrance wall, the exit wall, and the reflecting wall has a curved surface shape having an optical property that changes a degree of increase or decrease in a beam width of light beams passing through the one side wall to an increasing or decreasing direction.

2. The backlight unit according to claim 1, wherein all of the entrance wall, the exit wall, and the reflecting wall have the curved surface shape having the optical property.

3. The backlight unit according to claim 2, wherein the curved surface shape of the entrance wall, the exit wall, and the reflecting wall is a convex shape curving outward relative to the prism portion.

4. A head-up display device comprising:
a liquid crystal display device; and
a backlight unit, wherein
the backlight unit includes
a housing having an opening in which the liquid crystal display device is disposed,
a light source disposed inside the housing, and
an optical member disposed inside the housing and configured to turn a light beam path of light beams emitted by the light source toward the liquid crystal display device,
the optical member has a prism portion which is made of a translucent material to have a triangular prism shape,
the prism portion has one side wall serving as an entrance wall on which the light beams emitted by the light source are incident, another side wall serving as an exit wall from which light beams are emitted to the liquid crystal display device, and still another side wall serving as a reflecting wall that reflects the light beams that have been incident on the entrance wall to the exit wall inside the prism portion, and
at least one side wall among the entrance wall, the exit wall, and the reflecting wall has a curved surface shape having an optical property that changes a degree of increase or decrease in a beam width of light beams passing through the one side wall to an increasing or decreasing direction.

* * * * *